March 6, 1934.   E. A. NELSON   1,950,260
LINED BRAKE SHOE
Filed Oct. 2, 1931
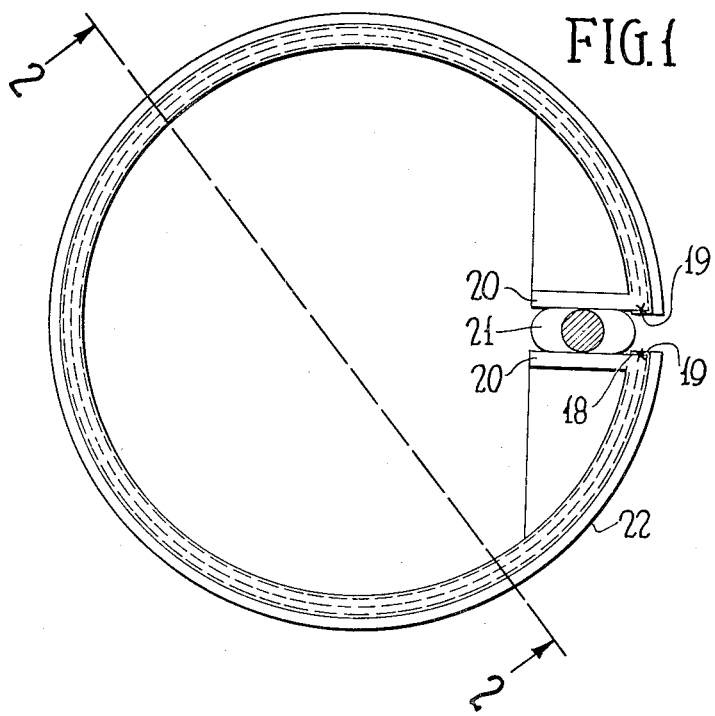
FIG.4
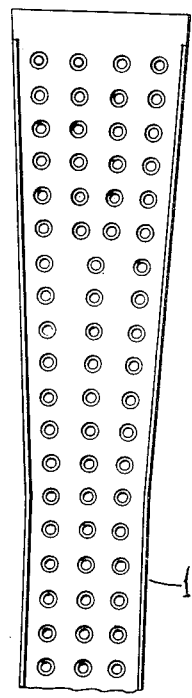
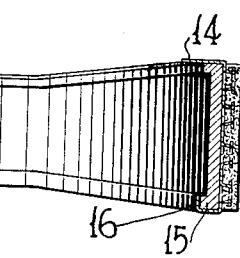
FIG.2
FIG.3
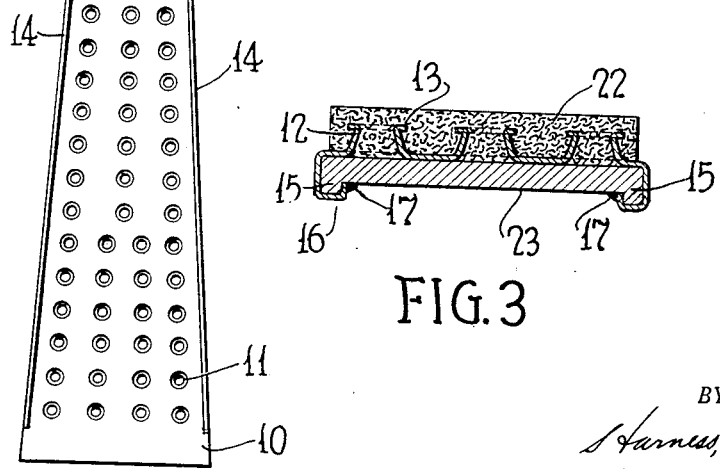
INVENTOR.
EMIL A. NELSON
BY
*Harness, Dickey, Pierce & Mann*
ATTORNEYS Patented Mar. 6, 1934

1,950,260

UNITED STATES PATENT OFFICE 1,950,260

LINED BRAKE SHOE

Emil A. Nelson, Detroit, Mich.

Application October 2, 1931, Serial No. 566,515

2 Claims. (Cl. 188—249)

My invention relates to the art of brakes and it has been my object to produce a brake shoe having a lining affixed thereto in a very secure manner. The invention also pertains to the production of a lining member per se capable of rapid and secure attachment to a brake shoe and in which the lining is very securely affixed to a backing plate constituting a part of the lining assembly. My invention embraces both product and method.

Other objects and advantages of my invention will be apparent from a reading of the subjoined specification in the light of the attached drawing, in which, Fig. 1 is a side elevation of a brake shoe lining in accordance with my invention.

Fig. 2 is a section on the line 2—2 of Fig. 1 illustrating the brake lining in process of assembly with the band.

Fig. 3 is a detail transverse section through my brake band, and

Fig. 4 is a bottom view of the backing plate constituting a part of the brake lining assembly before the application of the lining thereto.

Referring to the drawing by reference characters, the numeral 10 indicates a sheet metal backing plate adapted to receive a brake lining and to be secured in turn to a brake shoe in order to interconnect the parts. This backing plate is provided with a plurality of openings 11 which are flanged upwardly to afford a plurality of frustro-conical hollow projections or bosses 12. The bosses 12 are flanged outwardly as indicated at 13 and the main body of the backing plate is flanged at its side edges as indicated at 14, the flanges 14 extending in a direction opposite to that of the bosses 12.

In the practice of my invention I superimpose a mass of plastic brake lining material upon the backing plate 10 about and within the bosses 12, as indicated at 22. This step is performed under a considerable degree of pressure in order to mold the lining to its desired shape in contact with the backing plate. The backing plate with attached lining is thereafter cured to cause it to permanently assume the shape in which it has been molded, in a manner well known in the art.

The flat plate 10 is thereafter bent to conform to the shape of the brake shoe to which it is to be secured. In the present case I have illustrated it as applied to an arcuate flexible shoe of the band type, this shoe extending through nearly 360 degrees and being provided adjacent its ends with brackets 20 which may be formed integrally with the shoe or secured thereto, and receive between themselves a cam 21 adapted to spread the ends of the shoe in the application of the brake. The shoe is provided on its inner side with a pair of vertically extending flanges 15.

After the lining member has been formed to the general shape of the shoe 23 it has its lateral flanges 14 bent about the flanges 15 on the inner side of the shoe, as indicated at 16, in order to clinch the liner in place upon the outer periphery of the shoe, as illustrated in Fig. 2 and indicated at 16. These parts are preferably further secured in place by the application of globules of metal deposited thereon at 17. The longitudinal extremities of the liner are bent about the ends of the shoe as indicated at 18 and are spot welded thereto at 19.

It will thus be seen that I have devised a lined brake shoe which is very economical to manufacture and which may be produced by high speed methods. It will also be seen that the reversely curved nature of the bosses 12 of the backing plate 10 affords a very secure locking action of the backing plate with respect to the molded lining.

Modifications will be obvious to those skilled in the art and I do not therefore wish to be limited except by the scope of my sub-joined claims as interpreted in the light of the generic spirit of my invention.

What I claim is:

1. A brake shoe comprising an arcuate main body member having depending flanges upon opposite lateral extremities thereof, and a lining member comprising a backing plate and a body of brake lining material secured thereto, said backing plate having portions clinched about the flanges of said main body member.

2. A molded brake lining comprising a backing plate and a body of lining material, said backing plate having outwardly projecting hollow frustro-conical bosses extending from the main body thereof and flanged laterally outwardly, said body of lining material having portions molded into said frustro-conical bosses and other portions molded about the flanges upon said bosses.

EMIL A. NELSON.